(12) United States Patent
Park et al.

(10) Patent No.: US 12,490,771 B2
(45) Date of Patent: Dec. 9, 2025

(54) AEROSOL-GENERATING APPARATUS

(71) Applicant: KT&G CORPORATION, Daejeon (KR)

(72) Inventors: Ju Eon Park, Seoul (KR); Min Kyu Kim, Seoul (KR); Jong Sub Lee, Seongnam-si (KR); Byung Sung Cho, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 1028 days.

(21) Appl. No.: 17/606,646

(22) PCT Filed: Jul. 6, 2021

(86) PCT No.: PCT/KR2021/008562
§ 371 (c)(1),
(2) Date: Oct. 26, 2021

(87) PCT Pub. No.: WO2022/010224
PCT Pub. Date: Jan. 13, 2022

(65) Prior Publication Data
US 2023/0134145 A1    May 4, 2023

(30) Foreign Application Priority Data
Jul. 7, 2020    (KR) .......................... 10-2020-0083443

(51) Int. Cl.
*A24F 40/51* (2020.01)
*A24F 40/10* (2020.01)
(Continued)

(52) U.S. Cl.
CPC .............. *A24F 40/51* (2020.01); *A24F 40/10* (2020.01); *A24F 40/20* (2020.01); *A24F 40/30* (2020.01);
(Continued)

(58) Field of Classification Search
CPC .......... A24F 40/60; A24F 40/42; A24F 40/30; A24F 40/20; A24F 40/10; A24F 40/53; A24F 40/51
See application file for complete search history.

(56) References Cited

U.S. PATENT DOCUMENTS 6,053,176 A * 4/2000 Adams ................... A24F 40/53
                                                          131/329
10,881,141 B2    1/2021 Fraser et al.
(Continued)

FOREIGN PATENT DOCUMENTS

EP          2 989 912 A1    3/2016
KR    10-2010-0083168 A    7/2010
(Continued)

OTHER PUBLICATIONS

Extended European Search Report dated May 16, 2022 in Application No. 21794080.8.
(Continued)

*Primary Examiner* — Alex B Efta
(74) *Attorney, Agent, or Firm* — Sughrue Mion, PLLC

(57) ABSTRACT

An aerosol-generating apparatus according to an embodiment may include a plurality of chambers configured to accommodate a flavoring material; a rotating body configured to rotate the plurality of chambers; a coil antenna arranged such that an inductance of the coil antenna is changed by rotation of the rotating body; an inductive sensor configured to detect, the inductance and identify a rotation amount and a rotation direction of the rotating body based on a change in the inductance; and a processor configured to identify a chamber in use from among the plurality of chambers, based on the rotation amount and the rotation direction of the rotating body.

14 Claims, 6 Drawing Sheets

(51) Int. Cl.
*A24F 40/20* (2020.01)
*A24F 40/30* (2020.01)
*A24F 40/42* (2020.01)
*A24F 40/53* (2020.01)
*A24F 40/60* (2020.01)
*G01B 7/30* (2006.01)

(52) U.S. Cl.
CPC .............. *A24F 40/42* (2020.01); *A24F 40/53* (2020.01); *A24F 40/60* (2020.01); *G01B 7/30* (2013.01)

(56) References Cited

U.S. PATENT DOCUMENTS

| | | | |
|---|---|---|---|
| 11,019,847 B2 | 6/2021 | Watson et al. | |
| 2007/0045288 A1* | 3/2007 | Nelson | A61M 11/041 219/533 |
| 2010/0308808 A1 | 12/2010 | Yamagata et al. | |
| 2014/0060556 A1 | 3/2014 | Liu | |
| 2015/0101625 A1* | 4/2015 | Newton | A24F 40/60 131/329 |
| 2017/0135404 A1* | 5/2017 | Reevell | A24F 40/53 |
| 2019/0328044 A1 | 10/2019 | Qiu | |
| 2020/0036080 A1* | 1/2020 | Ourednik | H01Q 7/00 |
| 2020/0093184 A1* | 3/2020 | Crespo | H05B 1/0227 |
| 2020/0113232 A1 | 4/2020 | Bless et al. | |
| 2020/0120977 A1 | 4/2020 | Bless et al. | |
| 2021/0244101 A1 | 8/2021 | Fraser et al. | |

FOREIGN PATENT DOCUMENTS

| | | |
|---|---|---|
| KR | 10-2016-0112770 A | 9/2016 |
| KR | 10-1756725 B1 | 7/2017 |
| KR | 10-2018-0012830 A | 2/2018 |
| KR | 10-2019-0042014 A | 4/2019 |
| WO | 2019/022620 A1 | 1/2019 |
| WO | 2019/197170 A1 | 10/2019 |

OTHER PUBLICATIONS

International Search Report for PCT/KR2021/008562 dated Oct. 22, 2021 (PCT/ISA/210).

Written Opinion for PCT/KR2021/008562 dated Oct. 22, 2021 (PCT/ISA/237).

* cited by examiner

[Fig. 1]
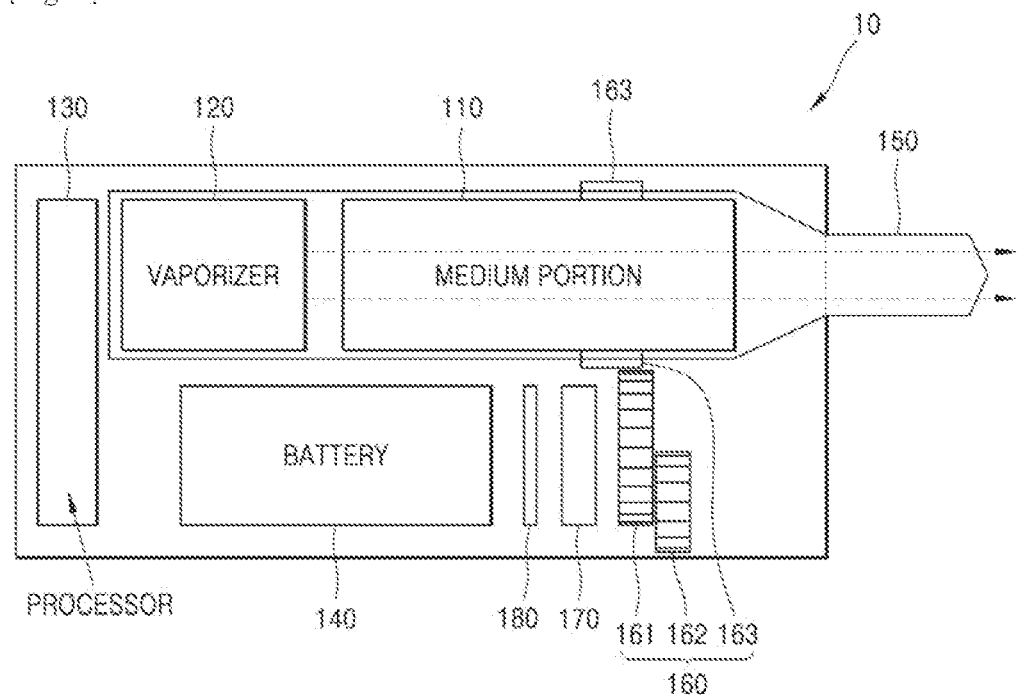
[Fig. 2]
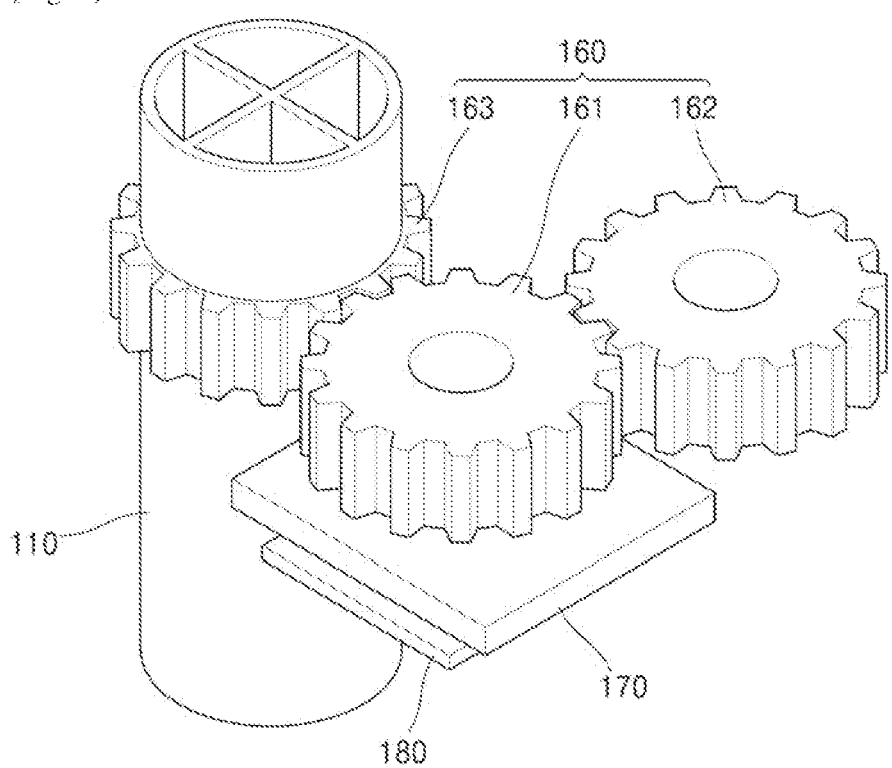

[Fig. 3]
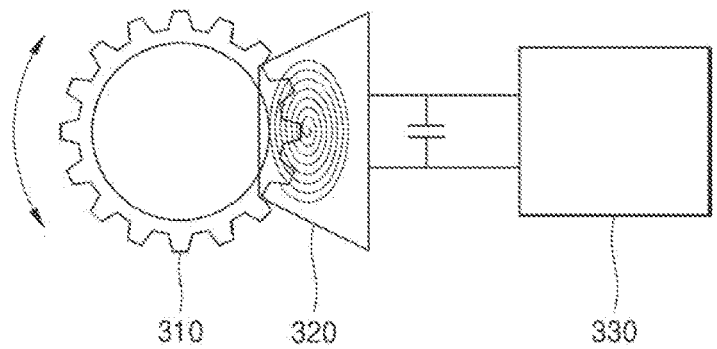
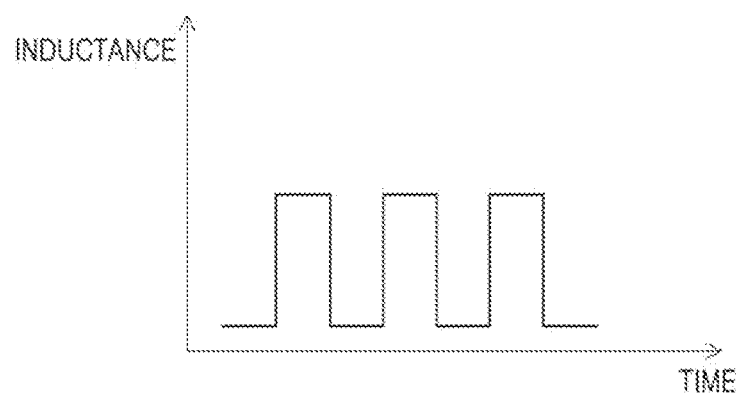
[Fig. 4]
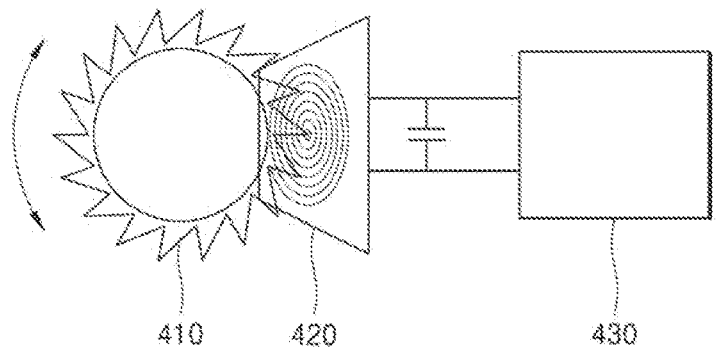
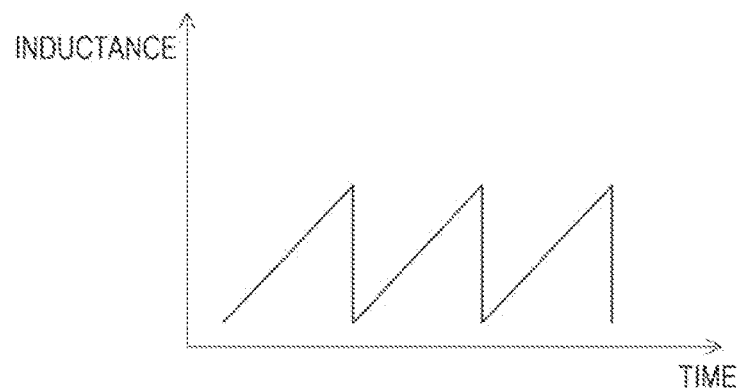

[Fig. 5]
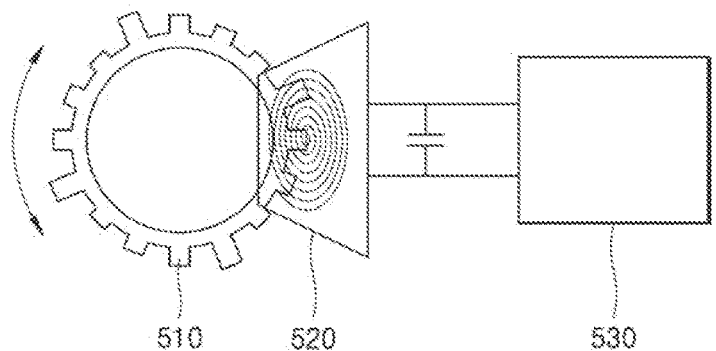
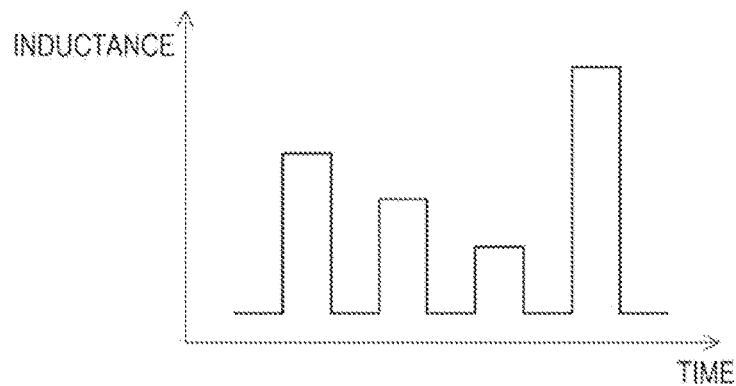
[Fig. 6]
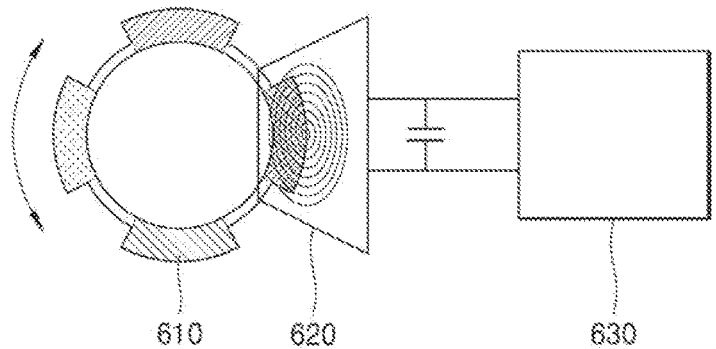
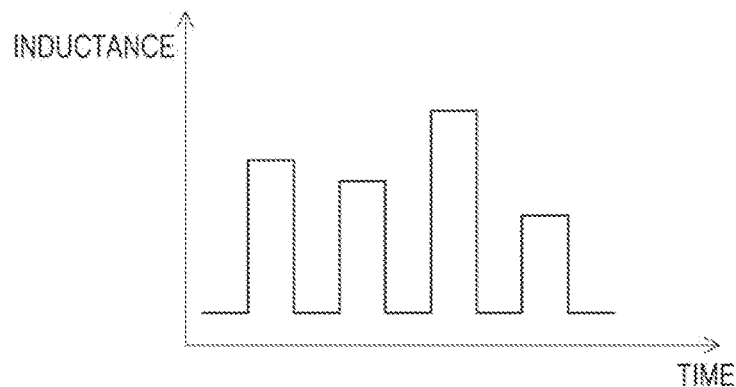

[Fig. 7]
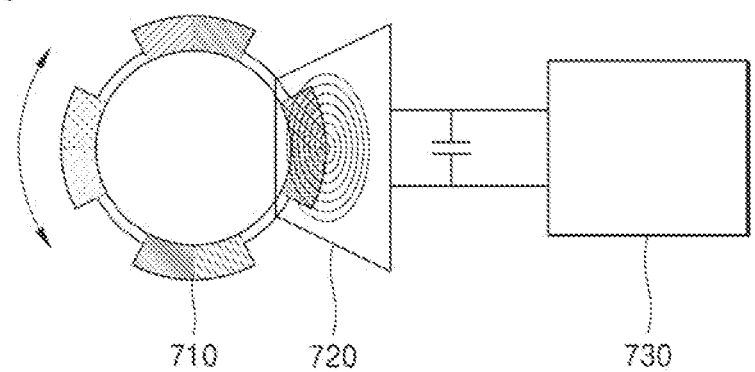
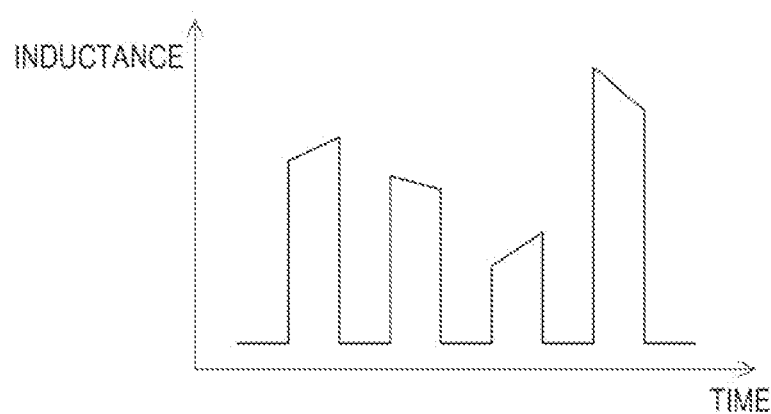

[Fig. 8]
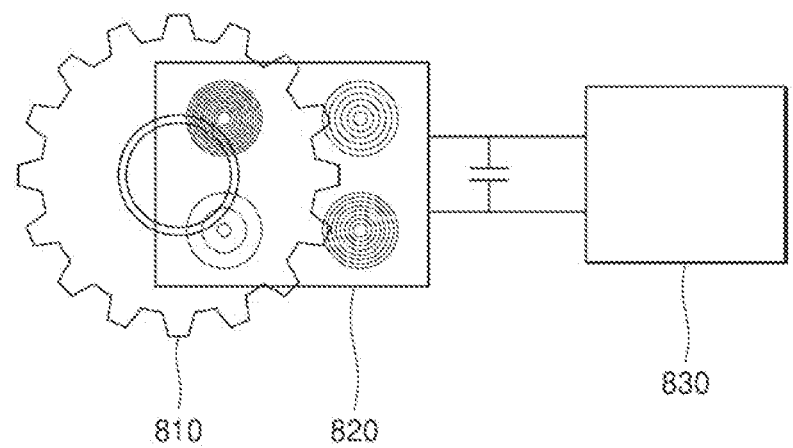
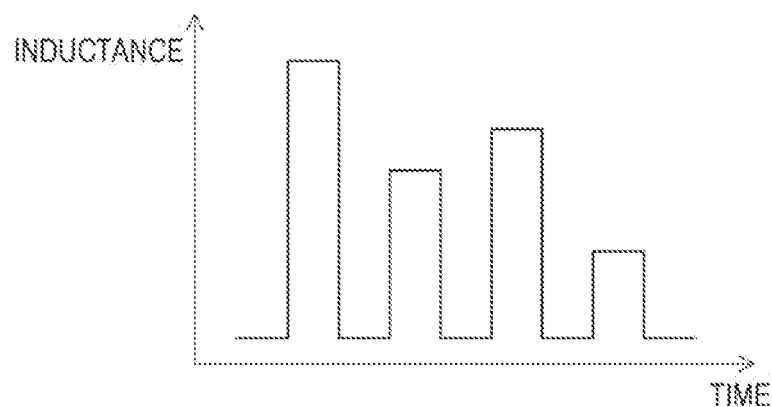

[Fig. 9]
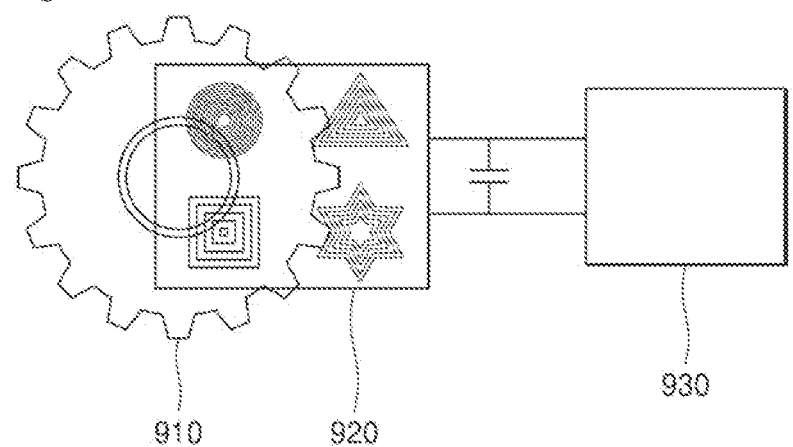
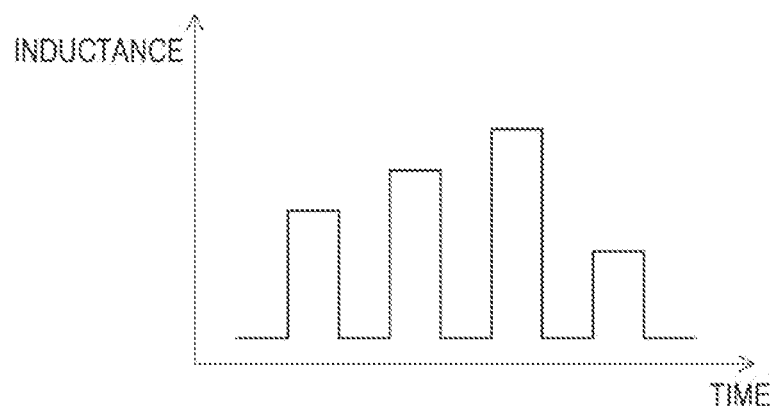

AEROSOL-GENERATING APPARATUS

CROSS REFERENCE TO RELATED APPLICATIONS

This application is a National Stage of International Application No. PCT/KR2021/008562 filed Jul. 6, 2021, claiming priority based on Korean Patent Application No. 10-2020-0083443 filed Jul. 7, 2020.

TECHNICAL FIELD

The disclosure relates to an aerosol-generating apparatus.

BACKGROUND ART

Recently, there has been growing demand for an aerosol-generating apparatus that generates an aerosol without combusting a general aerosol-generating article. In particular, studies have been conducted on an aerosol-generating apparatus configured to generate a flavored aerosol via a non-combustion method from an aerosol-generating material.

DISCLOSURE OF INVENTION

Technical Problem

When a separate switch and a printed circuit board (PCB) are used to identify a chamber in use in an aerosol-generating apparatus, a plurality of components may be required. However, a space for mounting and positioning elements in an aerosol-generating apparatus is limited.

Technical problems of the present embodiment are not limited to the above-stated technical problems, and other technical problems may be derived from the following embodiments.

Solution to Problem

As a technical solution to solve the above-described technical problems, the disclosure provides an aerosol-generating apparatus including a plurality of chambers configured to accommodate a flavoring material; a rotating body configured to rotate the plurality of chambers; a coil antenna arranged such that an inductance of the coil antenna is changed by rotation of the rotating body; an inductive sensor configured to detect the inductance and identify a rotation amount and a rotation direction of the rotating body based on a change in the inductance; and a processor configured to identify a chamber in use from among the plurality of chambers, based on the rotation amount and the rotation direction of the rotating body.

Advantageous Effects of Invention

The disclosure may provide an aerosol-generating apparatus. In detail, the aerosol-generating apparatus according to the disclosure may use an inductive sensor capable of detecting a metal object without contact. The inductive sensor may detect a rotation amount and a rotation direction of a rotating body without contacting the rotating body. Accordingly, the aerosol-generating apparatus may prevent damages such as corrosion and abrasion of its components such as the rotating body.

In addition, the aerosol-generating apparatus may identify a chamber in use by using the inductive sensor, without using a separate switch and a printed circuit board (PCB). Accordingly, available space for mounting and positioning in the aerosol-generating apparatus may increase, and the aerosol-generating apparatus may be downsized. The advantageous affects are not limited to the above-stated examples, and various other effects are included in the present specification.

BRIEF DESCRIPTION OF DRAWINGS

FIG. 1 is a diagram of a configuration of an aerosol-generating apparatus according to an embodiment;

FIG. 2 illustrates a perspective view of a rotating body according to an embodiment;

FIG. 3 illustrates a rotating body according to an exemplary embodiment.

FIG. 4 illustrates a structure of a rotating body according to an exemplary embodiment.

FIG. 5 illustrates a structure of a rotating body according to an exemplary embodiment.

FIG. 6 illustrates a structure of a rotating body according, to an exemplary embodiment.

FIG. 7 illustrates a structure of a rotating body according to an exemplary embodiment.

FIG. 8 illustrates a structure of a coil according to an exemplary embodiment.

FIG. 9 illustrates a structure of a coil according to an exemplary embodiments.

BEST MODE FOR CARRYING OUT THE INVENTION

According to an embodiment, there is provided an aerosol-generating apparatus including a plurality of chambers configured to accommodate a flavoring material; a rotating body configured to rotate the plurality of chambers; a coil antenna arranged such that an inductance of the coil antenna is changed by rotation of the rotating body; an inductive sensor configured to detect the inductance and identify a rotation amount and a rotation direction of the rotating body based on a change in the inductance; and a processor configured to identify a chamber in use from among the plurality of chambers, based on the rotation amount and the rotation direction of the rotating body.

The aerosol-generating apparatus may further include a vaporizer configured to generate an aerosol by heating an aerosol-generating material, and arranged to be in fluid communication with the chamber in use such that the aerosol passes through the chamber in use, from among the plurality of chambers.

The aerosol-generating apparatus may further include a counter configured to increase or decrease a count value based on the rotation amount and the rotation direction of the rotating body, wherein the processor is further configured to identify the chamber in use based on the count value.

The inductive sensor may convert an analog signal corresponding to the inductance into a digital signal, and identify the rotation direction of the rotating body based on the digital signal.

At least a portion of the rotating body may include a conductive material.

The inductance may change by at least one of a distance between the rotating body and the coil antenna, a shape of the rotating body, a material included in the rotating body, a shape of the coil antenna, and a number of turns of the coil antenna.

The inductive sensor may detect, based on the change in the inductance, whether the plurality of chambers rotated in a first direction or a second direction.

The rotating body may include a plurality of sawteeth having a same size, each of which having a bilaterally symmetrical shape.

The rotating body may include a plurality of sawteeth, wherein each of the plurality of sawteeth is bilaterally asymmetrical or the plurality of sawteeth respectively have different sizes, such that rotation of the rotating body in a first direction and rotation of the rotating body in a second direction causes different changes in the inductance.

The rotating body may include a plurality of partitions, wherein at least two or more partitions among the plurality of partitions may respectively include different conductive materials, such that, rotation of the rotating body in a first direction and rotation of the rotating body in a second direction causes different changes in the inductance.

The coil antenna may include a plurality of coils, wherein at least some of the plurality of coils have different numbers of turns or have different shapes from each other, such that rotation of the rotating body in a first direction and rotation of the rotating body in a second direction causes different changes in the inductance.

The aerosol-generating apparatus may further include a display configured to output visual information indicating the chamber in use.

The aerosol-generating apparatus may further include a puff detecting sensor configured to detect puffs of a user, and the processor may count a number of puffs of the chamber in use by using the puff detecting sensor.

When the number of puffs is equal to or greater than a threshold value, the processor may limit a heating operation of the user.

MODE FOR THE INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

As used herein, terms including an ordinal number such as "first" or "second" may be used to describe various components, but the components should not be limited by the terms. The terms are used only for the purpose of distinguishing one component from other components.

In the following embodiments, the term "longitudinal direction" indicates a lengthwise direction of the aerosol-generating apparatus.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the disclosure will be described in detail with reference to the drawings.

FIG. 1 is a diagram of a configuration of an aerosol-generating apparatus according to an embodiment.

Referring to FIG. 1, an aerosol-generating apparatus 10 may include a medium portion 110, a vaporizer 120, a processor 130, a battery 140, and a mouthpiece 150.

FIG. 1 illustrates components of the aerosol-generating apparatus 10, which are related to the present embodiment. Therefore, it will be understood by one of ordinary skill in the art related to the present embodiment that other general-purpose components may be further included in the aerosol-generating apparatus 10, in addition to the components illustrated in FIG. 1. In addition, an internal structure of the aerosol-generating apparatus 10 is not limited to the diagram shown in FIG. 1. In other words, according to the design of the aerosol-generating apparatus 10, the medium portion 110, the vaporizer 120, the processor 130, the battery 140, and the mouthpiece 150 may be differently arranged.

The aerosol-generating apparatus 10 related to the embodiment in FIG. 1, which is an apparatus for providing an aerosol to a user, may generate an aerosol by using a resistance healing method, an induction healing method, an ultrasound vibration method, or the like.

The medium portion 110 may include a plurality of chambers, which are divided from each other by separators. Each of the plurality of chambers may include a flavoring material through which the aerosol passes.

The flavoring material may be in a solid state. For example, the flavoring material may be provided in the form of granules, that is, powder or small particles. However, the disclosure is not necessarily limited thereto. For example, the flavoring material may be provided in the form of a capsule chopped plant leaves.

The flavoring material may include components that may provide various flavors or savors to the user.

The flavoring material may include, for example, a tobacco-containing material that includes a volatile tobacco-flavored component, additives such as flavors, a wetting agent, and/or organic acid, a flavoring material such as menthol or a moisturizer, plant extract, spices, flavorings, a vitamin mixture, or a combination thereof.

Examples of the spices in the flavoring material may include menthol, peppermint, spearmint oil, and various fruit-flavored ingredients, but are not limited thereto.

The flavoring material may include a vitamin mixture, and vitamin mixture may include at least one of vitamin A, vitamin B, vitamin C, and vitamin E, but embodiments are not limited thereto.

The medium portion 110 may rotate with respect to the vaporizer 120, and may include a plurality of chambers that are sequentially arranged in a rotation direction and separated from one another.

For example, the medium portion 110 may include two, three, or four chambers, but the number of the chambers are not limited thereto. For example, the medium portion 110 may have a cylindrical pipe shape, and the inner space may be partitioned into four chambers. The medium portion 110 may rotate in a clockwise direction or a counter-clockwise direction about a rotation axis extending in a longitudinal direction of the aerosol-generating apparatus 10. As the medium portion 110 rotates, relative positions of the four chambers included in the medium portion 110 with respect to the vaporizer 120 may change.

The vaporizer 120 may generate an aerosol by heating a liquid composition, and the generated aerosol may provided to the user through one of the plurality of chambers in the medium portion 110. In other words, the aerosol generated by the vaporizer 120 may pass through the air flow passage in the aerosol-generating apparatus 10, and the air flow passage may be configured such that the aerosol generated by the vaporizer 120 may be provided to the user through one of the plurality of chambers included in the medium portion 110.

The vaporizer 120 may generate the aerosol by changing a phase of the liquid composition into a gas phase. The aerosol may indicate a gas generated from the liquid composition, in which vaporized particles and air are mixed.

For example, the vaporizer 120 may include a liquid storage, a liquid delivery element, and a heating element, but it is not limited thereto. For example, the liquid storage, the liquid delivery element, and the heating element may be included in the aerosol-generating apparatus 10 as independent modules.

The liquid storage may store the liquid composition. The liquid composition may include a material in a liquid state or a gel slate, lire liquid composition may be maintained, in the liquid storage, in a state of being immersed into a porous material such as sponge or cotton.

For example, the liquid composition may be a liquid including a tobacco-containing material having a volatile tobacco flavor component, or a liquid including a non-tobacco material. The liquid storage may be formed to lie attached to and detached from the vaporizer 120. Alternatively, the liquid storage may be formed integrally with the vaporizer 120. When the liquid storage is formed integrally with the vaporizer 120, the vaporizer 120 may be detachable from the aerosol-generating apparatus 10.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick made of cotton fiber, ceramic fiber, glass fiber, or porous ceramic, but is not limited thereto.

The heating element is an element for heating the liquid composition delivered by the liquid delivery element. For example, the beating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be surrounded by the liquid storage.

The heating element may be heated by a current flowing through the heating element and may deliver heat to the liquid composition in contact with the heating element, thereby heating the liquid composition. However, embodiments are not limited thereto. For example, the vaporizer 120 may generate the aerosol by an ultrasound method or an induction heating method.

The vaporizer 120 may be referred to as a cartridge, a cartomizer, or an atomizer, but it is not limited thereto.

The vaporizer 120 and the medium portion 110 may be combined to be rotatable with respect to each other. For example, the vaporizer 120 may be fixed, and the plurality of chambers of the medium port ion 110 may rotate with respect to the vaporizer 120.

The vaporizer 120 may be arranged to be in fluid communication with one of the plurality of chambers. For example, the aerosol generated from the vaporizer 120 may pass only one of the plurality of chambers, which is in fluid communication with the vaporizer 120.

The vaporizer 120 may include a discharge port, which extends in the longitudinal direction of the aerosol-generating apparatus 10 and delivers the aerosol to the medium portion 110. The liquid storage delivers the aerosol, which is generated by the heating element, to the discharge port. Accordingly, the aerosol provided from the liquid storage is delivered to the medium portion 110 through the discharge port.

In a state where the vaporizer 120 and the medium portion 110 are combined to each other, relative positions of the vaporizer 120 and the medium portion 110 are changed, and thus, at least one of the plurality of chambers of the medium portion 110 may be at a position corresponding to the discharge port of the vaporizer 120. Therefore, the aerosol sent out from the discharge port of the vaporizer 120 passes through the flavoring material, which is accommodated in the chamber corresponding to the discharge port among the plurality of chambers. While the aerosol passes through the flavoring material, properties of the aerosol may be changed.

When the medium portion 110 includes a single chamber, even if a large amount of flavoring material is included in the chamber, the flavoring component may migrate intensively, and thus migration of the flavoring component may continue only fora short time. According to an embodiment, the medium portion 110 of the aerosol-generating apparatus 10 includes the plurality of chambers and one of the plurality of chambers is used by rotation of the medium portion 110. Accordingly, the duration of migration of the flavored component may increase by a factor of the number of chambers. In addition, as the duration of migration of the flavoring component may increase, an amount of the liquid composition that can be used with the flavoring component may also increase. Therefore, the flavoring component may be used for a long time without replacing the medium portion 110, and the use may enjoy various flavors of the aerosol when the chambers respectively include different flavoring materials.

The aerosol-generating apparatus 10 may include a mouthpiece 150 to be held in a user's mouth. The aerosol generated from the vaporizer 120 may be sent, out to the outside of the aerosol-generating apparatus 10 through the mouthpiece 150. In an example, the mouthpiece 150 may be formed at an end portion of the aerosol-generating apparatus 10.

The vaporizer 120, the medium portion 110, and the mouthpiece 150 may be combined to form an aerosol-generating assembly. The aerosol-generating assembly may have various shapes such as a cuboid or a cube. The aerosol generating assembly may be detachably coupled to the aerosol-generating apparatus 10. When the aerosol-generating assembly is inserted into the aerosol-generating apparatus 10, the aerosol-generating apparatus 10 may generate the aerosol by operating the vaporizer 120. The aerosol generated by the vaporizer 120 is delivered to the user through the medium portion 110.

The processor 130 may control overall operations of the aerosol-generating apparatus 10. In detail, the controller 130 may control not only operations of the battery 140 and the vaporizer 120, but also operations of other components included in the aerosol-generating apparatus 10. Also, the processor 130 may check a state of each of the components of the aerosol-generating apparatus 10 to determine whether the aerosol-generating apparatus 10 is able to operate.

The processor 130 may be implemented as an array of a plurality of logic gates or may be implemented as a combination of a general-purpose microprocessor and a memory in which a program executable in the microprocessor is stored. In addition, it will be understood by one of ordinary skill in the art that implementation in other types is also available.

The battery 140 provides power to be used for the aerosol-generating apparatus 10 to operate. For example, the battery 140 may provide power to heat the vaporizer 120, and may provide power for operating the processor 130. Also, the battery 140 may provide power for operations of a display, a sensor, a motor, etc. installed in the aerosol-generating apparatus 10.

The aerosol-generating apparatus 10 may include a rotating body 160, a coil antenna 170, and an inductive sensor 180. The rotating body 160 may include a dial gear 161, a dial 162, and a medium portion gear 163. The inductive sensor 180 may include a processor other than the processor 130. Hereinafter, an operating method of the rotating body 160, the coil antenna 170, and the inductive sensor 180 will be described in detail with reference to FIG. 2.

FIG. 2 illustrates a perspective view of a rotating body according to an embodiment.

Referring to FIG. 2, the rotating body 160 may include the dial gear 161, the dial 162, and the medium portion gear 163. As the medium portion 110 in FIG. 2 corresponds to the medium portion 110 in FIG. 1, repeated descriptions will be omitted.

In an embodiment, the rotating body 160 may rotate the plurality of chambers of the medium portion 110, and an inductance may change by rotation of the rotating body 160.

The dial gear 101 may be engaged with the dial 162 and the medium portion gear 163, and may deliver a rotation energy, which is applied to the dial 162, to the medium portion gear 163. An inductance change may be caused by rotation of the dial gear 161.

The dial 162 may rotate by the user's action. To this end, a portion of the dial 162 may be exposed to the outside of the aerosol-generating apparatus 10. The dial 162 may be engaged with the dial gear 161, and the rotation force applied by the user may be delivered to the dial gear 161 through the dial 162.

The medium portion gear 163 may be arranged to surround the medium portion 110 such that the medium portion 110 rotates along with the medium portion gear 163. The medium portion 110 may include a plurality of chambers that are divided by separators, and the plurality of chambers may rotate by the medium portion gear 163. Although it is shown that the medium portion 110 includes four chambers, the number of chambers is not limited thereto.

The dial gear 161, the dial 162, and the medium portion gear 163 may have various shapes such as a sawtooth shape shown in FIG. 2, and the dial gear 161, the dial 162, and the medium portion gear 163 may be differently arranged. In addition, the dial gear 161, the dial 162, and the medium portion gear 163 may have different numbers of sawteeth, and the numbers of sawteeth may be determined according to a certain ratio. For example, a ratio of the numbers of sawteeth of the dial 162, the dial gear 161, and the medium portion gear 163 may be 1:2:3, and the numbers of sawteeth of the dial 162, the dial gear 161, and the medium portion gear 163 may be respectively four, eight, and twelve. However, the number of sawteeth and the ratio of the number of sawteeth are not limited thereto.

Rotation directions of the dial gear 161, the dial 162, and the medium portion gear 163 may be different from or identical to one another. For example, when the dial 162 rotates in the clockwise direction, the dial gear 161 may rotate in the counterclockwise direction and the medium portion gear 163 may rotate in the clockwise direction. However, embodiments are not limited thereto.

At least one of the dial gear 161, the dial 162, and the medium portion gear 163 may be omitted according to embodiments. For example, the dial 162 and the medium portion gear 163 may be omitted, and the dial gear 161 may be exposed to the outside of the aerosol-generating apparatus such that the user may rotate the dial gear 161. In this case, the dial gear 161 may be directly coupled to the medium portion 110 such that the medium portion 110 rotates along with the dial gear 161.

The dial gear 161, the dial 162, and the medium portion gear 163 may include various materials, and may respectively include different materials. In an embodiment, at least a portion of the rotating body 160 may include a conductive material. For example, the dial gear 161 may include a conductive material, and the dial 162 and the medium portion gear 163 may include a non-conductive material. A portion of the sawteeth of the dial gear 161 may include a conductive material, and a remaining portion may include a non conductive material.

The inductance of the coil antenna 170 may change as the rotating body 160 rotates. The coil antenna 170 may also be referred to as a frame antenna or a loop antenna. For example, as the dial gear 161 rotates, and the coil antenna 170 under the dial gear 161 may cause an inductance change by electromagnetic induction.

As shown in FIG. 2, the coil antenna 170 may be arranged in parallel or perpendicular to the dial gear 161, but is not limited thereto.

The inductive sensor 180 may detect the inductance change and output a signal corresponding to a rotation amount and/or a rotation direction of the rotating body 160. For example, when the user rotates the dial 162, and the dial gear 161 engaged with the dial 162 and the medium portion 163 engaged with the dial gear 161 may rotate along. The inductance of the coil antenna 170 may change according to the rotation of the dial gear 161. The inductive sensor 180 may detect the inductance change.

In an embodiment, the rotating body 160 may rotate the medium portion 110, and the inductive sensor 180 may output the signal corresponding to the rotation amount and the rotation direction of the rotating body 160. For example, when the medium portion 110 includes four chambers, the rotating body 160 may rotate the medium portion 110 by 90° at a time. In this case, the inductive sensor 180 may output a signal corresponding to the rotation of the medium portion 110 by 90° in the clockwise direction.

In an embodiment, the inductive sensor 180 may convert an analog signal, which corresponds to the measured inductance, into a digital signal, lire inductive sensor 180 and/or the processor 130 may identify the rotation amount and the rotation direction of the rotating body 160 based on the detected inductance change (e.g., based on the analog signal and/or the digital signal output by the inductive sensor 180). The inductive sensor 180 may include an analog digital converter (ADC), and may convert the analog signal into the digital signal by using the ADC. For example, when the user rotates the rotating body 160 to rotate the medium portion 110 by 90° in the clockwise direction, the inductance change may be caused by rotation of the rotating body 160. The inductive sensor 180 may convert an analog signal, which corresponds to the inductance change, into the digital signal by using the ADC, and may output the digital signal.

The inductive sensor 180 may detect the inductance which is affected by at least one of a distance between the rotating body 160 and the coil antenna 170, the shape of the rotating body 160, the materials included in the rotating body 160, the shape of the coil antenna 170, and the number of turns of the coil antenna 170. For example, when the distance between the rotating body 160 and the coil antenna 170 changes by the rotation of the rotating body 160, an inductance change may occur, and the inductive sensor 180 may detect the inductance change. In addition, the inductance may also be affected by the shape and the number of turns of the coil antenna 170, which will be described with reference to FIGS. 8 and 9.

In an embodiment, the inductive sensor 180 may sense, based on the inductance change, whether the plurality of chambers rotated in the first direction or the second direction. The first awl second directions may be opposite directions. For example, the first direction may be the clockwise direction, and the second direction may be the counterclockwise direction.

In an embodiment where the dial 162 only rotates in the first direction and the medium portion gear 163 only rotates in the second direction, the inductive sensor 180 may sense, based on the inductance change, the amount of notation of the plurality of chambers in the second direction.

In another embodiment where the rotating body 160 may rotate in either direction, the inductive sensor 180 may detect the amount and the direction of rotation of the plurality of chambers. For example, the inductive sensor 180 may detect that the plurality of chambers rotated by 90° in the first, direction and then rotated by 180° in the second direction. Alternatively, based on the inductance change detected by the inductive sensor 180, the processor 130 may determine the amount, and/or the direction of rotation of the plurality of chambers.

The inductive sensor 180 may detect the inductance change without contacting the rotating body 160 and output the signal corresponding to the rotation amount and the rotation direction of the rotating body 160. Therefore, abrasive damage to components such as the rotating body 160, the coil antenna 170, the inductive sensor 180, and the like may be prevented.

Referring again to FIG. 1, the rotating body 160 may rotate the medium portion 110, which causes an inductance change. The inductive sensor 180 may detect the inductance change and output the signal corresponding to the rotation amount and the rotation direction of the rotating body 160.

The processor 130 may determine the chamber in use among the plurality of chambers, based on the signal output from the inductive sensor 180. The chamber in use corresponds to lire chamber that is in fluid communication with the vaporizer 120, and the aerosol generated from the vaporizer 120 may pass through the chamber in use. The chamber in use refers to one of the plurality of chambers of the medium portion 110, which is aligned with the discharge port of the vaporizer 120.

In an embodiment, the aerosol-generating apparatus 10 may further include a counter. The counter may increase or decrease a count value, by using a signal corresponding to the rotation amount and the rotation direction of the rotating body 160 as an input signal. The counter may store the count value or output the count value as an output signal.

For example, assume that the medium portion 110 includes lour chambers arranged in the order of a first chamber, a second chamber, a third chamber, and a fourth chamber in the clockwise direction, and the chamber in use is the first chamber. As the rotating body 160 rotates, the medium portion 110 may rotate by 180° in the clockwise direction, such that the third chamber may be in fluid communication with the vaporizer 120. Assuming that a count value corresponding to the first chamber is set as zero, the counter may increase the count value by two, by using a signal indicating rotation of the medium portion 110 by 180° in the clockwise direction as an input signal. As a chamber corresponding to the count value two is the third chamber, the processor 130 may determine the third chamber as the chamber in use.

The aerosol-generating apparatus 10 may further include general-purpose components in addition to the battery 140, the processor 130, the medium portion 110, and the vaporizer 120. In an embodiment, the aerosol-generating apparatus 10 may include a user interface such as a display capable of outputting visual information, a motor for outputting haptic information, and/or a speaker for outputting sound. The display may output visual information indicating the chamber in use. For example, the display may output light corresponding to a flavor of the chamber in use. As the visual information indicating the chamber in use may be provided to the user, the user may easily change the flavor of the aerosol by selecting one of the plurality of chambers. As another example, the user interface may output information indicating the currently-activated flavor corresponding to the chamber in use. As another example, the user interface may output the available number of puffs with the currently-activated flavor.

In addition, the aerosol-generating apparatus 10 may include at least one sensor. In an embodiment, the aerosol-generating apparatus 10 may include a puff detecting sensor configured to detect pulls of the user. The puff detecting sensor may detect change in a pressure or a flow rate of air when the user puffs the aerosol. The puff detecting sensor may include a pressure sensor, an air flow rate sensor, and the like.

The processor 130 may count the number of puffs of the chamber in use by using the puff detecting sensor. For example, the processor 130 may determine the chamber in use, and may count, by using the pressure sensor, the number of puffs in the chamber in use.

When the number of puffs is equal to or greater than a threshold value, the processor 130 may limit a heating operation of the vaporizer 120. For example, when the number of puffs that is counted is fifty or greater, the heating operation of the vaporizer 120 may be limited. As the heating operation of the vaporizer 120 are limited, the user may not puff the aerosol having a burnt taste, and satisfaction of the user may be enhanced.

When the number of puffs that is counted is equal to or greater than the threshold value, the aerosol-generating apparatus 10 may provide a notification to the user by using the display, a speaker, and the like.

FIGS. 3 through 7 illustrate a structure of a rotating body according to different embodiments.

Referring to FIG. 3, a rotating body 310 may include a plurality of sawteeth. Although FIG. 3 only shows a dial gear of the rotating body 310, embodiments are not limited thereto. For example, a dial and/or a medium portion gear may be further included in the rotating body 310 as necessary. The dial, the dial gear, and the medium portion gear may respectively have different rotation amounts, and the respective rotation amounts may be determined according to a certain ratio. The rotating body 310, a coil antenna 320, and an inductive sensor 330 shown in FIG. 3 respectively correspond to the rotating body 160, the coil antenna 170, and the inductive sensor 180 shown in FIG. 2, and therefore, repeated descriptions are omitted.

The plurality of sawteeth of the rotating body 310 may have the same size, and each sawtooth may be bilaterally symmetrical. When the rotating body 310 rotates, an inductance change may occur. The inductive sensor 330 may detect the plurality of chambers rotating in one of the first direction or the second direction based on the inductance change. For example, in an embodiment where the rotating body 310 only rotates in the first direction, the inductive sensor 330 may detect the amount of rotation of the plurality of chambers in the first direction.

The inductance change may be affected by a distance between the rotating body 310 and the coil antenna 320. As the plurality of sawteeth all have the same size and each sawtooth is bilaterally symmetrical, the signal output from the inductive sensor 330 may have uniform rectangular pulses as shown in FIG. 3.

The graph may indicate the signal output from the inductive sensor 330. The horizontal axis of the graph may indicate time, and the vertical axis of the graph may indicate the detected inductance.

The inductive sensor 330 may be set as active high or active low. The inductive sensor 330 may output a signal corresponding to a rotation amount by using an active high or active low state of the graph. For example, when the inductive sensor 330 is set as active high, when the digital signal representing the measured inductance changes from low to high, a signal corresponding to the rotation amount of the rotating body 310 may be output. For example, each time the digital signal changes from low to high, the inductive sensor 330 may output a signal corresponding to a 90° rotation of the medium portion. In another example, when the digital signal changes three times from low to high, the inductive sensor 330 may output a signal corresponding to 90° rotation of the medium portion.

Referring to FIG. 4, a rotating body 410 may include a plurality of sawteeth. FIG. 4 only shows a dial gear of the rotating body 410, but embodiments are not limited thereto. For example, a dial and a medium portion gear may be further included in the rotating body 410 as necessary. The rotating body 410, a coil antenna 420, and an inductive sensor 430 shown in FIG. 4 correspond to the rotating body 310, the coil antenna 320, and the inductive sensor 330, and therefore, repeated descriptions are omitted.

The plurality of sawteeth of the rotating body 410 may have the same size and each sawtooth may be bilaterally asymmetrical. When the rotating body 410 rotates, an inductance change may occur. Since each sawtooth is asymmetrical, the sawteeth of the rotating body 410 may cause different inductance changes with respect rotation in the first direction and rotation in the second direction, respectively.

Accordingly, the inductive sensor 430 may detect the direction of rotation of the plurality of chambers based on the inductance change. For example, the inductive sensor 430 may detect the plurality of chambers rotating by 90° in the first direction and then rotating by 180° in the second direction.

The inductance change may be affected by a distance between the rotating body 410 and the coil antenna 420 and a shape of the sawteeth of the rotating body 410. Since the plurality of sawteeth of the rotating body 410 shown in FIG. 4 are each bilaterally asymmetrical and have the same size, the graph representing the inductance detected by the inductive sensor 430 may have a sawtooth wave as shown in FIG. 4.

The horizontal axis of the graph may indicate time, and the vertical axis of the graph may indicate the detected inductance. As aforementioned, in the present embodiment, rotation in the first direction and rotation in the second direction may cause different inductance changes, because each sawtooth is asymmetrical. Assuming that the graph shown in FIG. 4 represents a rotation in the first direction, the graph will be horizontally flipped in the case of a rotation in the second direction.

The inductive sensor 430 may detect a rotation amount based on an active high or active low state of the inductance. For example, each time the inductance changes from low to high, the inductive sensor 430 may output a signal corresponding to 90° rotation of the medium portion. Also, the inductive sensor 430 may detect the amount of the inductance change based on the sign of the inductance change. For example, when the sign of the inductance change is positive (i.e., when the inductance increases), the inductive sensor 430 may output a signal corresponding to the first direction.

Referring to FIG. 5, a rotating body 510 may include a plurality of sawteeth. FIG. 5 only shows a dial gear of the rotating body 510, but embodiments are not limited thereto. For example, a dial gear and/or a medium portion gear may be further included in the rotating body 510 as necessary. The rotating body 510, a coil antenna 520, and an inductive sensor 530 shown in FIG. 5 correspond to the rotating body 410, the coil antenna 420, and the inductive sensor 430 shown in FIG. 4, and therefore, repeated descriptions are omitted.

As shown in FIG. 5, the plurality of sawteeth of the rotating body 510 may have different sizes. When the rotating body 510 rotates, an inductance change may occur. The sawteeth of the rotating body 510 may be arranged such that rotation in the first direction and rotation in the second direction cause different, inductance changes according to the different sizes of the sawteeth.

Accordingly, the inductive sensor 530 may detect the rotation direction of rotation of the plurality of chambers, as well as the rotation amount. For example, the inductive sensor 530 may detect the plurality of chambers rotating by 180° in the first direction and then rotating by 90° in the second direction.

The inductance change may be affected by a distance between the rotating body 510 and the coil antenna 520. The plurality of sawteeth of the rotating body 510 shown in FIG. 5 respectively have different sizes, and each sawtooth is bilaterally symmetrical. Accordingly, a graph representing the inductance detected by the inductive sensor 530 may include rectangular pulses with different magnitudes, as shown in FIG. 5.

As aforementioned, in the present embodiment, rotation in the first direction and rotation in the second direction may cause different inductance changes according to the different sizes of the plurality of sawteeth. Assuming that the graph shown in FIG. 5 represents a rotation of the rotating body 510 in the first direction, the graph will be horizontally flipped in the case of a rotation in the second direction.

The inductive sensor 530 may detect a rotation amount based on an active high or active low state of the inductance, and may detect the rotation direction based on the sign and/or the amount of the inductance change. For example, when the inductance changes twice from low to high, the inductive sensor 530 may output a signal corresponding to 180° rotation of the medium portion 110. Also, the inductive sensor 530 may output a signal corresponding to a rotation direction, based on the sign and/or the amount of inductance change (i.e., based on a difference between two consecutive pulses in the graph representing the measured inductance).

In an embodiment, when a chamber corresponding to a size of the sawteeth is set in advance, a processor of the aerosol-generating apparatus may recognize a chamber corresponding to the magnitude of inductance change, based on the magnitude of the inductance change according to the size of sawteeth.

Referring to FIG. 6, a rotating body 610 may include a plurality of sawteeth. FIG. 6 only shows a dial gear of the rotating body 610, but embodiments are not limited thereto. For example, a dial and/or a medium portion gear may be further included in the rotating body 610 as necessary. The rotating body 610, a coil antenna 620, and an inductive sensor 630 shown in FIG. 6 correspond to the rotating body 510, the coil antenna 520, and the inductive sensor 530, and therefore, repeated description will be omitted.

The plurality of sawteeth of the rotating body 610 may or may not have the same size. Among the plurality of sawteeth of the rotating body 610, at least two or more sawteeth may respectively include different conductive materials. For example, the rotating body 610 may include four sawteeth, and the four sawteeth may respectively include different conductive materials. The four sawteeth may respectively include gold (Au), silver (Ag), copper (Cu), and nickel (Ni), but are not limited thereto.

When the rotating body 610 rotates, an inductance change may occur. The sawteeth of the rotating body 610 may be arranged such that rotation in the first direction and rotation in the second direction cause different inductance changes according to the different materials of the sawteeth.

Accordingly, the inductive sensor 630 may detect the rotation direction of the plurality of chambers as well as the rotation amount. For example, the inductive sensor 630 may detect the plurality of chambers rotating by 180° in the first direction and then rotating by 180° in the second direction.

An inductance change may be affected by the materials included in the rotating body 610. The plurality of sawteeth of the rotating body 610 shown in FIG. 6 have the same size and are bilaterally symmetrical, but the respective sawteeth include different materials. Accordingly, a graph representing the detected inductance may have rectangular pulses with different magnitudes, as shown in FIG. 6.

As aforementioned, in the present embodiment, rotation in the first direction and rotation in the second direction may cause different inductance changes according to the different materials of the sawteeth. Assuming that the graph shown in FIG. 6 represents a rotation of the rotating body 610 in the first direction, the graph will be horizontally flipped in the case of a rotation in the second direction.

The inductive sensor 630 may detect a rotation amount based on an active high or active low state of the measured inductance. For example, when the inductance changes twice front low to high, the inductive sensor 630 may output a signal corresponding to 90° rotation of the medium portion.

Also, the inductive sensor 630 may detect the rotation direction based on a sign and/or an amount of the inductance change. For example, the inductive sensor 630 may output a signal corresponding to the second direction when the inductance has increased by a first value, and may output a signal corresponding to the first direction when the inductance has decreased by a second value, but embodiments are not limited thereto.

In an embodiment, when a chamber corresponding to a certain amount of the inductance change is set in advance among the plurality of chambers, the processor of the aerosol-generating apparatus may recognize the chamber based on the amount of the inductance change.

Referring to FIG. 7, a rotating body 710 may include a plurality of sawteeth. FIG. 7 only shows a dial gear of the rotating body 710, but embodiments are not limited thereto. For example, a dial and/or a medium portion gear may be further included in the rotating body 710 as necessary. The rotating body 710, a coil antenna 720, and an inductive sensor 730 shown in FIG. 7 correspond to the rotating body 610, the coil antenna 620 and the inductive sensor 630 in FIG. 6, and therefore, repeated descriptions are omitted.

The plurality of sawteeth of the rotating body 710 may or may not have the same size. The rotating body 710 may include a plurality of partitions, and at least two or more partitions among the plurality of partitions may respectively include different conductive materials. One partition in the rotating body 710 may be a sawtooth, or may be part of a sawtooth. For example, as shown in FIG. 7, the rotating body 710 may include four sawteeth, and each of the four sawteeth may include two partitions. Eight partitions may respectively include different conductive materials.

When the rotating body 710 rotates, an inductance change may occur. The sawteeth of the rotating body 710 may be arranged such that rotation in the first direction and rotation in the second direction cause different inductance changes.

Accordingly, the inductive sensor 730 may detect the direction of rotation of the plurality of chambers, as well as the rotation amount. For example, the inductive sensor 730 may detect the plurality of chambers rotating by 180° in the first direction and then rotating by 90° in the second direction.

An inductance change may be affected by materials included in the rotating body 710. The plurality of sawteeth of the rotating body 710 shown in FIG. 7 have the same size and each sawtooth is bilaterally symmetrical, but the restrictive partitions include different materials. Accordingly, a graph representing the inductance detected by the inductive sensor 730 may have bilaterally asymmetric pulses with different magnitudes as shown in FIG. 7.

As aforementioned, in the present embodiment, rotation in the first direction and rotation in the second direction may cause different inductance changes according to the different materials of the partitions. Assuming that the graph shown in FIG. 7 represents a rotation of the rotating body 710 in the first direction, the graph will be horizontally flipped in the case of a rotation in the second direction.

The inductive sensor 730 may detect a rotation amount based on an active high or active low state of the inductance. For example, when the inductance changes twice from low to high, the inductive sensor 730 may output a signal corresponding to 180° rotation of the medium portion.

In an embodiment, the inductive sensor 730 may detect the rotation direction, based on an amount and a sign of the inductance change. For example, the inductive sensor 730 may output a signal corresponding to the second direction when the inductance has increased by a first value, and may output a signal corresponding to the first direction when the inductance has decreased by a second value, but embodiments are not limited thereto.

FIGS. 8 and 9 illustrate a structure of a coil according to different embodiments.

Referring to FIG. 8, a coil antenna 820 may include a plurality of coils. FIG. 8 only shows a dial gear of a rotating body 810, but embodiments are not limited thereto. For example, a dial and/or a medium portion gear may be further included in the rotating body 810 as necessary. The rotating body 810, the coil antenna 820, and the inductive sensor 830 shown in FIG. 8 correspond to the rotating body 710, the coil antenna 720, and the inductive sensor 730 in FIG. 3, and therefore, repeated descriptions are omitted.

The plurality of coils in the coil antenna 820 may or may not have the same size. At least some of the plurality of coils may have different, numbers of turns.

When the rotating body 810 rotates, an inductance change may occur. The coils in the coil antenna 820 may be arranged such that rotation of the rotating body 810 in the first direction and rotation in the second direction cause different inductance changes according to the different numbers of turns of the coils.

Accordingly, the inductive sensor 830 may detect the rotation direction of the plurality of chambers as well as the rotation amount. For example, the inductive sensor 830 may detect the plurality of chambers rotating by 180° in the first direction and then rotating by 90° in the second direction.

An inductance change may be affected by the number of turns of the coils. In an embodiment where the plurality of coils of the coil antenna 820 shown in FIG. 8 have the same size and different numbers of turns, a graph representing the inductance detected by the inductive sensor 830 may have bilaterally symmetrical pulses with different magnitudes, as shown in FIG. 8.

As aforementioned, in the present embodiment, rotation in the first direction and rotation in the second direction may cause different inductance changes. Assuming that the graph shown in FIG. 8 represents a rotation in the first direction, the graph will be horizontally flipped in the case of a rotation in the second direction.

The inductive sensor 830 may detect the rotation amount based on the active high or active low state of the detected inductance. For example, when the inductance changes twice from high to lows the inductive sensor 830 may output a signal corresponding to 180° rotation of the medium portion 110.

In an embodiment, the inductive sensor 830 may detect the rotation direction, based on an amount and/or a sign of the inductance change. For example, the inductive sensor 830 may output a signal corresponding to the second direction when the inductance has increased by a first value, and may output a signal corresponding to the first direction when the inductance has decreased by a second value, but embodiments are not limited thereto.

In an embodiment, the plurality of coils of the coil antenna 820 may respectively include cores therein, the cores respectively including different materials. For example, the cores may include ferrite, nickel, zinc, and the like. The plurality of coils including cores that respectively include different materials may cause different inductance changes with respect to rotation in the first direction and rotation in the second direction of the rotating body 810, respectively.

Referring to FIG. 9, a coil antenna 920 may include a plurality of coils. FIG. 9 only shows a dial gear of a rotating body 910, but embodiments are not limited thereto. For example, a dial and a medium portion gear may be further included in the rotating body 910 as necessary. The rotating body 910, the coil antenna 920, and an inductive sensor 930 shown in FIG. 9 correspond to the rotating body 810, the coil antenna 820, and the inductive sensor 830 shown in FIG. 8, and therefore, repeated descriptions are omitted.

Some of the plurality of coils in the coil antenna 920 may have different shapes.

When the rotating body 910 rotates, an inductance change may occur. The coils in the coil antenna 920 may be arranged such that rotation the rotating body 910 in the first direction and rotation in the second direction cause different inductance changes according to the different shapes of the coils.

Accordingly, the inductive sensor 930 may detect the rotation direction of the plurality of chambers as well as the rotation amount. For example, the inductive sensor 930 may detect the plurality of chambers rotating by 180° in the first direction and then rotating by 90° in the second direction.

The induction change may be affected by shapes of the coils. The plurality of coils in the coil antenna 920 shown in FIG. 9 respectively have different shapes. For example, the coil antenna 920 may include four coils, and the four coils may respectively have a circle shape, a triangle shape, a square shape, and a star shape. A graph representing the inductance detected by the inductive sensor 930 may have bilaterally symmetrical pulses with different magnitudes, as shown in FIG. 9.

As aforementioned, in the present embodiment, rotation in the first direction and rotation in the second direction may cause different inductance changes. Assuming that the graph shown in FIG. 9 represents a rotation in the first direction, the graph will be horizontally (lipped in the case of a rotation in the second direction.

The inductive sensor 930 may detect the rotation amount based on an active high or active low state of the detected inductance. For example, when the inductance changes twice from high to low, the inductive sensor 930 may output a signal corresponding to 90° rotation of the medium portion 110.

In an embodiment, the inductive sensor 930 may detect the rotation direction, based on an amount and/or a sign of the inductance change. For example, the inductive sensor 930 may output a signal corresponding to the first direction when the inductance has increased by a first value, and may output a signal corresponding to the second direction when the inductance has decreased by a second value, but embodiments are not limited thereto.

The inductive sensor 930 may detect the inductance change according to structures of the rotating body 910 and the coil antenna 920, and a counter may increase or decrease a counter value, by using a signal corresponding to a rotation amount and a rotation direction of the rotating body 910 as an input signal. The processor may determine a chamber corresponding to the count value as the chamber in use, by using the count value. However, embodiments are not limited thereto, and various methods of identifying the chamber in use based on the rotation amount and rotation direction. For example, when a chamber corresponding to a certain amount of inductance change is set advance, the chamber in use among the plurality of chambers may be identified according to the amount of inductance change. As such, the currently activated flavor and the available number of pulls with the chamber in use may be notified to the user. Accordingly, unexpected termination of migration of flavor components may be prevented. Also, the aerosol-generating apparatus according to the embodiments may be miniaturized because an inductive sensor has a small size.

The descriptions of the above-described embodiments are merely examples, and it will be understood by one of ordinary skill in the an that various changes and equivalents

The invention claimed is:

1. An aerosol-generating apparatus comprising:
   a plurality of chambers configured to accommodate a flavoring material;
   a coil antenna;
   a rotating body configured to rotate with the plurality of chambers relative to the coil antenna, the rotating body comprising a plurality of teeth that change an inductance of the coil antenna by rotation of the rotating body;
   an inductive sensor configured to detect the inductance and identify a rotation amount and a rotation direction of the rotating body based on a change in the inductance; and
   a processor configured to identify a chamber in use from among the plurality of chambers, based on the rotation amount and the rotation direction of the rotating body.

2. The aerosol-generating apparatus of claim 1, further comprising a vaporizer configured to generate an aerosol by heating an aerosol-generating material, and arranged to be in fluid communication with the chamber in use such that the aerosol passes through the chamber in use, from among the plurality of chambers.

3. The aerosol-generating apparatus of claim 1, further comprising a counter configured to increase or decrease a count value based on the rotation amount and the rotation direction of the rotating body,
   wherein the processor is further configured to identify the chamber in use based on the count value.

4. The aerosol-generating apparatus of claim 1, wherein the inductive sensor is further configured to convert an analog signal corresponding to the inductance into a digital signal, and identify the rotation direction of the rotating body based on the digital signal.

5. The aerosol-generating apparatus of claim 1, wherein the rotating body comprises a conductive material.

6. The aerosol-generating apparatus of claim 1, wherein the inductance changes according to at least one of a distance between the rotating body and the coil antenna, a shape of the rotating body, a material included in the rotating body, a shape of the coil antenna, and a number of turns of the coil antenna.

7. The aerosol-generating apparatus of claim 1, wherein the inductive sensor is further configured to detect, based on the change in the inductance, whether the plurality of chambers are rotated in a first direction or a second direction.

8. The aerosol-generating apparatus of claim 1, wherein the plurality of teeth are sawteeth having a same size, each of which has a bilaterally symmetrical shape.

9. The aerosol-generating apparatus of claim 1, wherein the plurality of teeth are sawteeth, and
   wherein each of the plurality of sawteeth is bilaterally asymmetrical or the plurality of sawteeth respectively have different sizes, such that rotation of the rotating body in a first direction and rotation of the rotating body in a second direction causes different changes in the inductance.

10. The aerosol-generating apparatus of claim 1, wherein the rotating body comprises a plurality of partitions, and
    at least two or more partitions from among the plurality of partitions comprise different conductive materials from each other, such that rotation of the rotating body in a first direction and rotation of the rotating body in a second direction causes different changes in the inductance.

11. The aerosol-generating apparatus of claim 1, wherein the coil antenna comprises a plurality of coils, and
    at least some of the plurality of coils have different numbers of turns or have different shapes from each other, such that rotation of the rotating body in a first direction and rotation of the rotating body in a second direction causes different changes in the inductance.

12. The aerosol-generating apparatus of claim 1, further comprising a display configured to output visual information indicating the chamber in use.

13. The aerosol-generating apparatus of claim 1, further comprising a puff detecting sensor configured to detect puffs of a user,
    wherein the processor is further configured to count a number of puffs with respect to the chamber in use by using the puff detecting sensor.

14. The aerosol-generating apparatus of claim 13, wherein the processor is further configured to limit a heating operation of the aerosol-generating apparatus when the number of puffs is equal to or greater than a threshold value.

* * * * *